US007537100B2

(12) United States Patent
Mustalahti et al.

(10) Patent No.: US 7,537,100 B2
(45) Date of Patent: May 26, 2009

(54) METHOD AND APPARATUS FOR MOVING A PALLET RUNNING ON WHEELS IN A TRAVELATOR OR EQUIVALENT

(75) Inventors: Jorma Mustalahti, Hyvinkää (FI); Esko Aulanko, Kerava (FI); Marc Ossendorf, Bochum (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/631,864

(22) PCT Filed: Jun. 6, 2005

(86) PCT No.: PCT/FI2005/000260

§ 371 (c)(1),
(2), (4) Date: Jan. 8, 2007

(87) PCT Pub. No.: WO2006/003238

PCT Pub. Date: Dec. 1, 2006

(65) Prior Publication Data

US 2008/0038104 A1 Feb. 14, 2008

(30) Foreign Application Priority Data

Jul. 7, 2004 (FI) .................................. 20040950

(51) Int. Cl.
*B66B 21/10* (2006.01)
*B65G 17/18* (2006.01)

(52) U.S. Cl. .................... 198/321; 198/475.1; 198/800; 198/798

(58) Field of Classification Search ................. 198/321, 198/475.1, 797–800
See application file for complete search history.

(56) References Cited

U.S. PATENT DOCUMENTS

| | | | | |
|---|---|---|---|---|
| 1,353,799 | A | 9/1920 | Boyce | |
| 2,195,326 | A * | 3/1940 | Crawford et al. | 198/798 |
| 2,369,840 | A * | 2/1945 | Nalbach et al. | 198/799 |
| 2,414,164 | A | 1/1947 | Nalbach | |
| 2,493,857 | A | 1/1950 | Cargill | |
| 2,893,538 | A | 7/1959 | Buttironi et al. | |
| 3,243,032 | A * | 3/1966 | Chambon | 198/465.3 |
| 5,060,779 | A * | 10/1991 | Landaeus | 198/321 |

FOREIGN PATENT DOCUMENTS

| | | |
|---|---|---|
| EP | 83500 A1 * | 7/1983 |
| GB | 2 299 316 | 10/1996 |
| WO | WO-2006/003238 | 1/2006 |

* cited by examiner

*Primary Examiner*—Mark A Deuble
(74) *Attorney, Agent, or Firm*—Venable LLP; Robert Kinberg; Steven J. Schwarz

(57) ABSTRACT

A method for changing the direction of motion of a pallet moving on wheels at an end of a travelator. The method comprises moving the pallet in a traveling direction at a first level, positioning a supporting element in alignment to receive a wheel of the pallet using a positioning device, positively guiding a trailing end of the pallet from the first level to a second level different than the first level by supporting the wheel of the pallet with the supporting element, and moving the pallet in a return direction at the second level. The pallet maintains a substantially constant orientation during the change of direction of motion.

12 Claims, 4 Drawing Sheets

METHOD AND APPARATUS FOR MOVING A PALLET RUNNING ON WHEELS IN A TRAVELATOR OR EQUIVALENT

CROSS-REFERENCE TO RELATED APPLICATIONS

This application is the National Stage of International Application No. PCT/FI2005/000260, filed Jun. 6, 2005, which claims the priority benefit of Application No. FI20040950, filed in Finland on Jul. 7, 2004.

BACKGROUND

1. Technical Field

The present invention relates to a method and apparatus for changing the direction of motion of a pallet moving on wheels at the end of a travelator or equivalent.

2. Related Art

Like escalators, travelators are conveying devices primarily designed to move people and their goods. They differ from escalators, e.g., in that they are often operated in a substantially horizontal orientation or in an orientation somewhat inclined, e.g., typically by about 1-15° relative to their direction of motion. Successive steps or pallets typically form a substantially even and rectilinear conveyor track instead of stair-like steps as in escalators. Instead of successive steps, the travelator may also have a continues belt, in which case the travelator resembles a belt conveyor. Travelators are also referred to as moving sidewalks and autowalks. Travelators differ from bulk and freight conveyors essentially in that travelators are designed by considering special requirements related to transportation of people, such as convenience of use and safety.

In prior art travelators, the structure is embedded in the ground or in the floor of a building. In such solutions, pits about one meter deep and several meters long are provided at either end of the travelator to accommodate the machinery of the travelator structure and the pallet turn-around mechanism. The sinking depth required in the middle part of the travelator is about half a meter. A drawback with this type of travelator construction is that they require heavy and fixed structures in the floor of the space around them, which is why they have to be taken into account at the time when the building is being designed. A further drawback is that moving such fixed structures from one place to another as required when the traffic needs change is completely impossible.

In prior art solutions, the pallet track typically comprises pallets having a length of about 15 to 40 cm, corresponding to escalator steps. The pallets are connected together as a chain, normally using a chain or, e.g., a cogged belt, and the whole belt is driven around by means of a machine and a chain wheel, so that the upper pallets in the chain, being supported by rollers, move on a special track.

At the end of the pallet track, the pallets are turned upside down around a wheel of a large diameter and return back to the beginning of the track below the track. At the beginning end the returning pallets are again turned around to their normal transport position and continue moving on the track towards the terminal end of the track.

One of the problems with such a prior art solution is that the pallets are turned around at the ends of the track, requiring the space where the pallets are turned to have a depth at least equal to the length of the pallet. In practice, however, the depth is about 1.5 to 2 times the length of the pallet because, otherwise, the operation will not be smooth enough.

Patent document No. GB2299316 depicts in FIG. 1/3 a structure of the above-mentioned type as an example of the prior art. In addition, this patent document discloses a travelator construction wherein the pallets are guided at their turning points by fixed tracks keeping them continuously in a horizontal orientation. Thus, the pallet is not turned upside down at the turning point. The pallets are actually guided along a curved track by wheels placed in the forward part of the pallet as seen in the direction of motion while the wheels in the rear part remain substantially free. However, the solution according to this patent document involves the problem that there are so-called dead centers at the end points of the track where the position of the pallet is not completely precisely defined. For this reason, the pallet may get jammed at the dead center, in which case the whole apparatus will stop due to the operating disturbance and may even be damaged. The risk of pallets getting jammed is increased by the running clearances, non-ideal track design and wear of the mechanism.

SUMMARY

An object of the present invention is to overcome the above-mentioned drawbacks and create a reliable method and apparatus of simple mechanical construction for changing the direction of motion of a pallet at the end of a travelator or equivalent. A further object of the invention is to produce a low-construction travelator structure that can be mounted directly on its base, e.g., a floor. Embodiments are presented in the description and figures of the present application. The inventive content disclosed in the application can also be defined in other ways than is done in the claims below. The inventive content may also consist of several separate inventions, especially if the invention is considered in the light of explicit or implicit subtasks or in respect of advantages or sets of advantages achieved. In this case, some of the attributes contained in the claims below may be superfluous from the point of view of separate inventive concepts. The invention can be conceivably used in the marketing of travelators or renovations of building spaces utilizing travelators, and the invention may also provide a way of reconfiguring building spaces by disposing travelators so as to achieve new solutions in arrangements regarding building spaces and/or internal traffic in the building. For example, in existing buildings, travelators can be installed in spaces where floor height has so far restricted installation.

Embodiments of the method and apparatus of the invention have the advantage that, due to the low construction, the travelator structure can be mounted directly on its base. The total height of the travelator structure at its lowest can be only a little over the height of two pallets, allowing a space for the returning pallets to pass under the pallets above. In such a solution the base may be, e.g., an asphalt surface or a concrete surface either outdoors or inside a building. The structure does not at all require a pit or corresponding space specially made for it, so the invention provides advantages in terms of economy in cost, as well as flexibility in location of installation. In addition, if necessary, the travelator structure of the invention can be moved to a new place with minor modification work and at a low modification cost. A further advantage is that the invention enables a light structure such that the floor under the travelator forms the final stiffening of the structure.

Yet another advantage is that the pallet will not get jammed at any stage at its dead center, so the structure works reliably and no operating disturbances due to jamming occur. Therefore, the travelator can be constructed using quite long pallets, even as long as over one meter in the direction of motion. In practice, for reasons of manufacture and installation and to avoid very long travelator end portions, a preferable pallet length in the direction of motion is between 350 mm and 700 mm. An advantageous pallet length is about 500 mm, which allows the travelator end portions to be made to a reasonable size and the pallet to be manufactured by extruding the pallet body as a unitary piece while the weight of the pallet remains relatively low in view of installation work.

An additional advantage is that, when the pallet is to be transferred from one level to the other during a direction change, it is always moved by the current rearward wheels, in other words, alternately by "front" wheels and by "rear" wheels. This, combined with the fact that both the pallet and the track have a mirror image-like structure in the longitudinal direction of the track, enables a simple construction that allows the pallets to be driven in a clockwise direction as well as in a counter-clockwise direction. Moving the pallets by their wheels also provides the advantage that during direction change the paths of the pallets are precise and, due to the continues grip, the transfer operation is quiet. Besides, no extra clatter occurs during the change of direction of the pallets because the idler that moves the pallets and functions as a supporting element is in contact with the bearing wheels of the pallet which have a soft surface layer. Clatter and other extra noise are also inhibited by having the idler so positioned that it will meet the bearing wheel in an advantageous position. Such positioning of the idler also improves the reliability of the conveyor as a whole and reduces the risk of disturbance. The positioning of the idler is preferably accomplished by using a positioning device attached to the idler. Between contacts of the idler with the wheels of the pallet, i.e., the bearing wheels, the positioning device forces the idler into a position in which the idler is ready to receive the approaching bearing wheel into a specific area provided on the idler and designed for bearing wheel contact, this area being referred to as the engaging area. In the castellated wheel-type idler described hereinafter, the engaging area is the bay between the castellations of the castellated wheel. "Between bearing wheel contacts" in this context means a situation where the bearing wheel of a pallet whose direction of motion is being changed does not determine the position of the idler by contact with it.

BRIEF DESCRIPTION OF THE DRAWINGS

Aspects of the invention will now be described by way of example only with reference to the accompanying drawings, in which.

DETAILED DESCRIPTION

Figure 1:
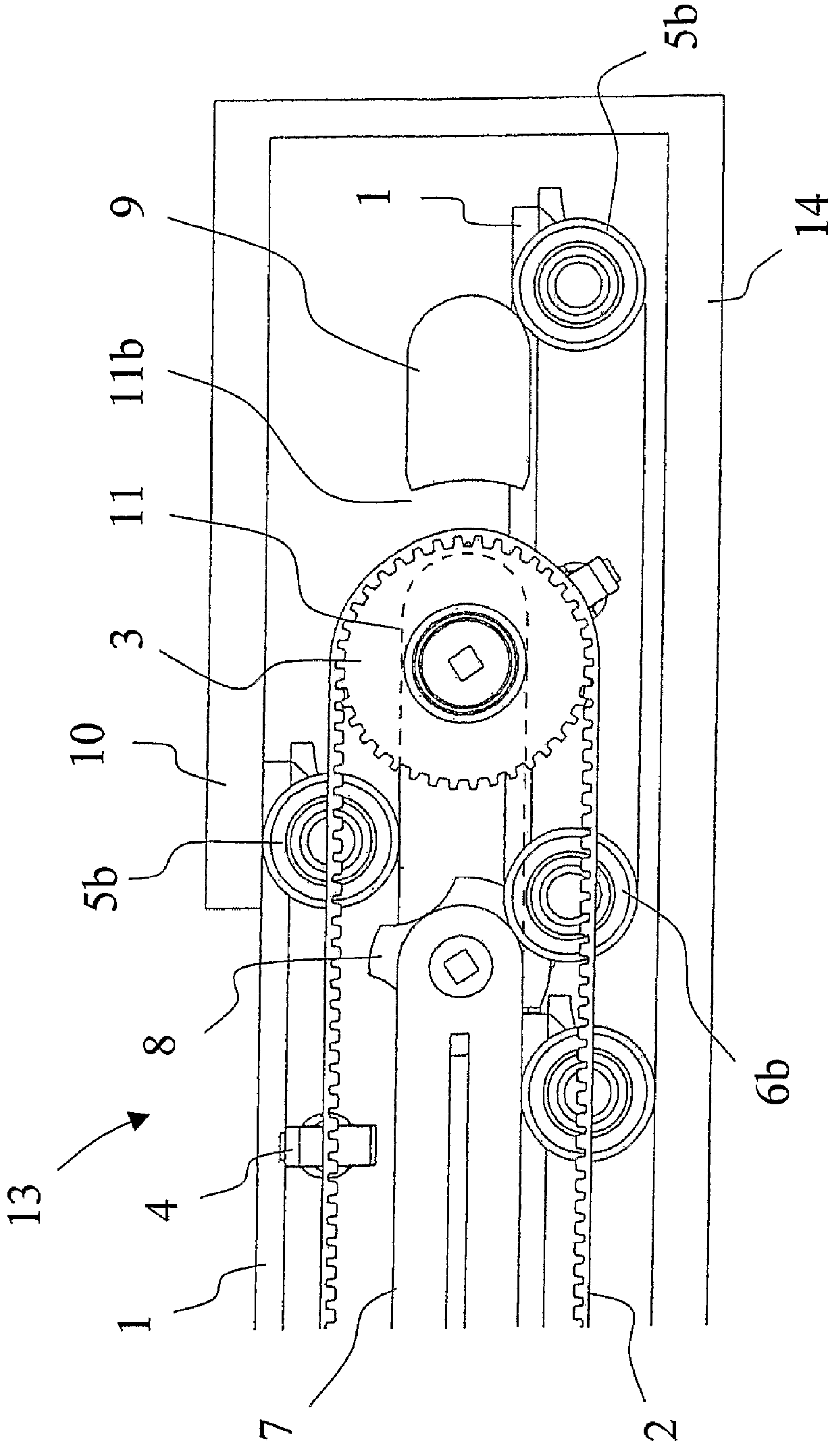
FIG. 1 depicts a side view of an embodiment of a travelator structure of the invention at the entry end.

Referring to FIG. 1, an embodiment of a travelator structure 13 of the invention comprises a frame structure 14, the function of which is to hold the equipment together and transmit the forces to the base under it. Inside the frame structure is a pallet track, on the upper surface of which the passengers stand. In addition, the travelator structure comprises at least a pallet track drive machine with a drive sprocket 3 and a cogged belt 2 as well as handrails and the drive machine for driving them.

Figure 4:
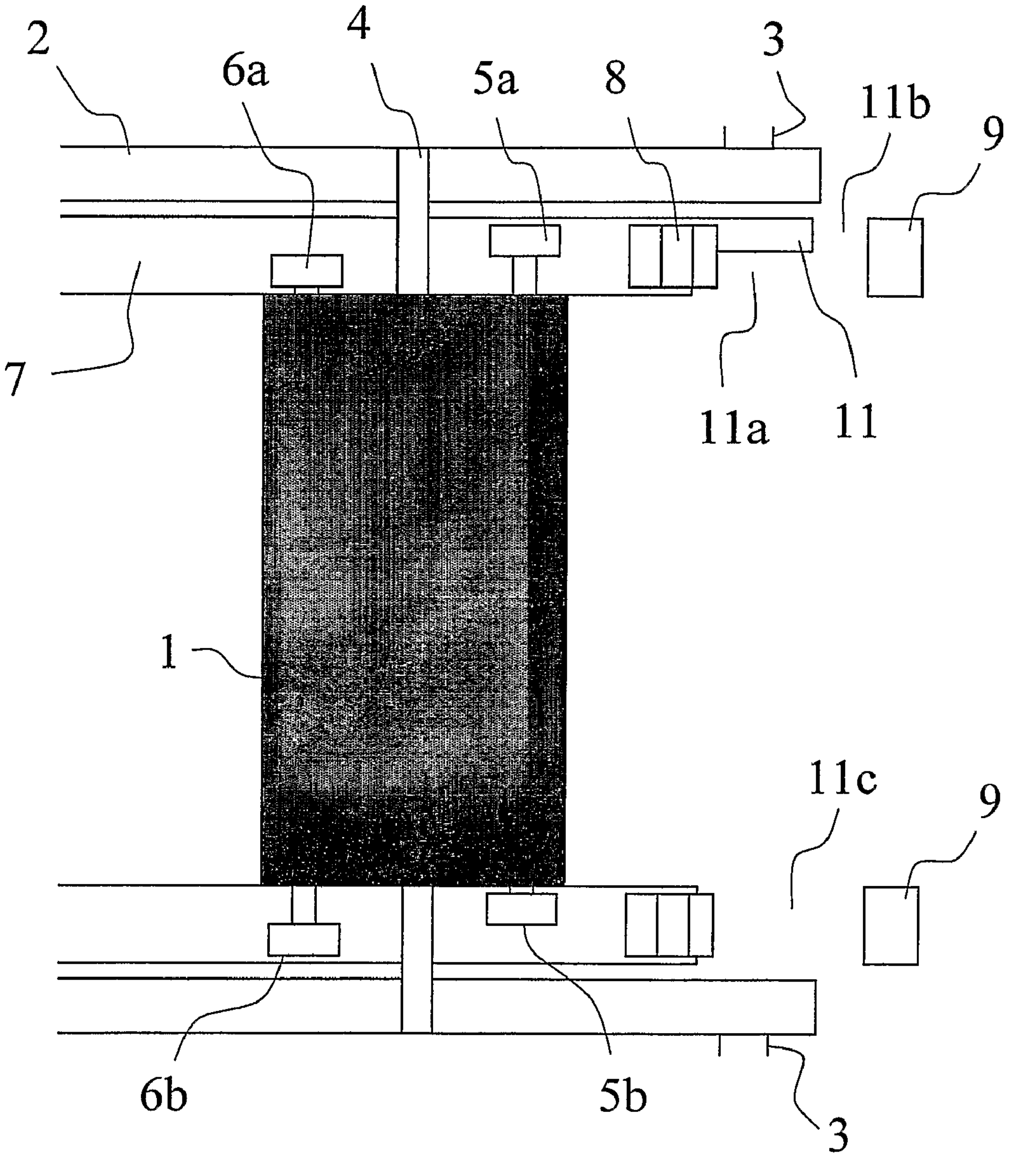
FIG. 4 depicts a top view of the entry end of the embodiment of a travelator structure of the invention.

The pallet track consists of separate pallets 1 having wheels. The front wheels 5*a* and 5*b* of each pallet are located at the forward corners of the pallet relative to the normal direction of motion of the travelator; likewise, the rear wheels 6*a* and 6*b* are located at the rearward corners of the pallet. As shown in FIG. 4, the front wheel 5*a* at the forward corner is offset outwardly by a predetermined distance from the pallet with respect to the corresponding rear wheel 6*a* on the same side of the pallet. Similarly, rear wheel 6*b* at the rearward corner is offset outwardly by a predetermined distance from the pallet with respect to corresponding front wheel 5*b* on the same side of the pallet. The pre-determined distance is in both cases substantially equal. In addition, the predetermined distance is set such that it allows the rear wheel 6*a* to fall down onto the return track, and correspondingly, at the other end of the travelator, it allows the front wheel 5*b* to rise up onto the upper track 7. Before being lowered onto the return track, the pallet is supported through part of the distance by at least three wheels 5*a*, 6*a* and 6*b*.

Referring to FIG. 1, the pallets 1 have a fastening element 4 at either edge of the pallet, placed roughly in the middle part of the pallet relative to the direction of motion of the pallet, for fastening the pallet by its side edge to the cogged belt 2. The pallet 1 is secured to the cogged belt 2 in such a way that the fastening element 4 allows the pallet to remain in the same orientation throughout the direction change, i.e., with the knurled bearing surface facing substantially upwards.

The pallets 1 supporting the passengers, driven by the cogged belt 2, move on their wheels 5 and 6 along the upper tracks 7, whereas the pallets running in the return direction move on the same wheels along a running surface in the lower part of the frame structure 14. At the end of the travelator, the leading end of the pallets goes under a so-called step plate 10, which is usually a comb plate. In about the same area, the normal track 7 narrows on one side of the travelator so as to form an extension 11 of the track, where rear wheel 6*a* is no longer supported by the normal track 7. Therefore, in the area of the extension 11, rear wheel 6*a* is free to fall through passage opening 11*a* onto the return track. As shown in FIG. 4, the track extension 11 continues as a narrower track and is situated along the line of passage of the outer wheel 5*a* at the leading end of the pallet substantially at the same vertical position with the track 7. The outer front wheel 5*a* of the pallet is thus supported by the extension 11 to prevent the leading end of the pallet from being tilted at the beginning of the direction change. The spacing between the rear wheel 6*a* and the pallet on the same side of the pallet is smaller than the distance between the side edge and the front wheel 5*a*. Accordingly, the rear wheel 6*a* can not be supported by the track extension 11. Thus the extension 11 does not prevent the rear part of the pallet from descending through the passage opening 11*a* to the level of the running surface of the frame structure 14 during a direction change.

A corresponding track structure can also be located at the exit end of the pallet track, in which case it forms a longitudinal mirror image of the above-described entry-end structure. At the exit end, rear wheel 6*b* is supported by a corresponding extension and front wheel 5*b* can rise to its upper position via the beginning end of the track, where a suitable opening is provided for the front wheel 5*b* closer to the inner edge of the pallet. As the structure at the exit end is substantially identical to the structure at the entry end, the exit end is not separately depicted in the drawings.

At the forward end of each track 7 is an idler 8. The idler 8 forms an extension of the track and supports the trailing end of the pallet 1. The idler 8 is mounted on its axle so as to be freely rotatable. The idler 8 is a castellated type wheel such that the idler 8 has, e.g., four engaging areas 12 having the shape of a circular arc corresponding to the wheels 5*a*, 5*b* and 6*a*, 6*b* of the pallet 1, forming indentations. The engaging areas 12 at first support the front wheels 5*a*, 5*b* of the pallet and finally the rear wheels 6*a*, 6*b* when the pallet passes over the idler 8 at the entry end, i.e., at the terminal end of the travelator. Therefore, at least three of the wheels of the pallet are continuously engaged by an idler 8. At the same time, the idler 8 forces the trailing end of the pallet 1 over a possible dead center spot during the change of direction of the pallet. The idler 8 receives its driving power from the pallet coming after it, the front wheel 5*a*, 5*b* of which turns the idler forwards. The placement and structure of the idler 8, the distances between successive engaging areas, and the width of the idler are dimensioned such that both the front wheel 5*a*, 5*b* and the rear wheel 6*a*, 6*b* of the pallet 1 are each supported in their turn by the engaging areas 12 of the idler 8. The radius of curvature of the engaging areas are at least equal to, but preferably somewhat larger than, the radius of the wheels 5*a*, 5*b* and 6*a*, 6*b* of the pallet. As the positively driven idler 8 supports the trailing end of the pallet at the terminal end of the travelator, and controls its motion during a direction change, the orientation of the pallet is continuously precisely controlled during the direction change, so the movement of the pallet can not get jammed at any point during the direction change.

The dimensions of a structure provided with an idler 8 having four castellations can be calculated by the following equation:

$$L=\tfrac{1}{2}*(p-\pi/2*r),\text{ where:}$$

L=distance of the center of rotation of the idler 8 from the center of rotation of the drive sprocket 3; it is also the distance of the center of the wheels 5 and 6 from the fastening element 4 of the pallet 1;

p=distance between the fastening elements 4 of successive pallets, preferably as an even number of cogs or chain pieces; and r=radius of pitch of the belt wheel.

Located beyond the track extension 11 in the direction of motion of the pallet track is a passage opening 11*b*, shown in FIG. 1. The location and length of the opening 11*b* are dimensioned such that the fastening element 4 of the pallet can move through the passage opening 4 from the upper position to the lower position during the direction change of the pallet. Similarly, located on the other side of the travelator in the area of the passage opening extension 11 and passage opening 11*b* is a passage opening 11*c*, shown in FIG. 4, which preferably extends from the idler 8 at the end of the track to the first end of a supporting bar 9 located at a distance from the idler 8. During the direction change of the pallet, the rear wheel 6*b* and one of the fastening elements 4 of the pallet move through passage opening 11*c* from the upper level to the lower level.

Figure 2:
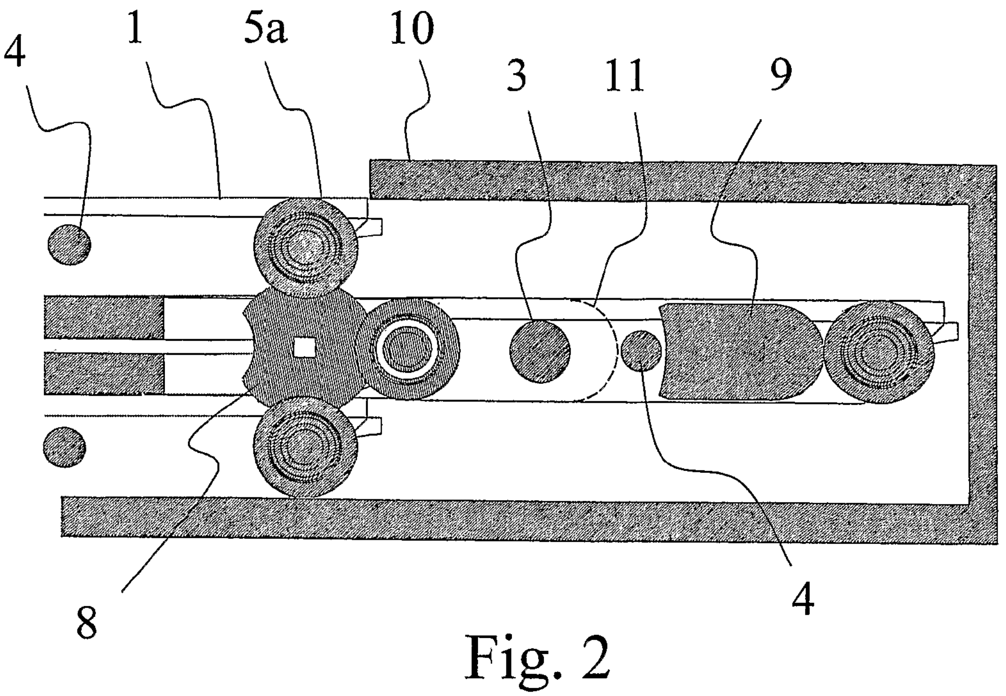
FIG. 2 depicts a side view of the entry end of the embodiment of a travelator structure of the invention at one stage and sectioned.
Figure 3:
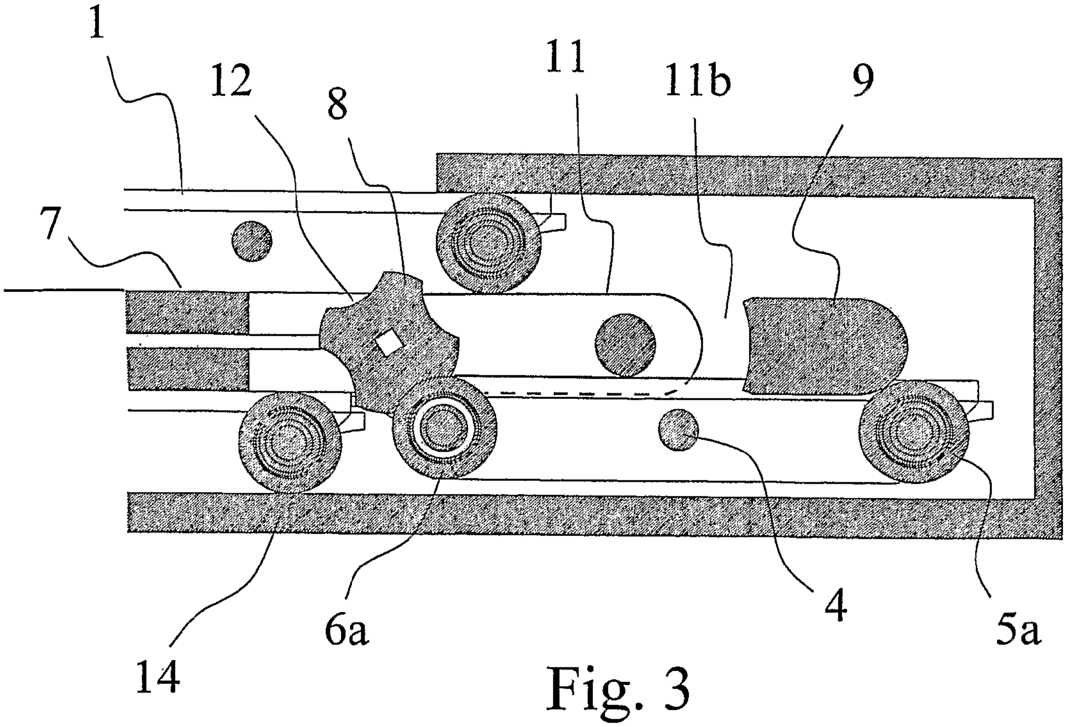
FIG. 3 depicts a side view of the entry end of the embodiment of a travelator structure of the invention at another stage and sectioned.

The length of the bearing surface of the supporting bars 9 located ahead of passage openings 11*b* and 11*c* in the direction of motion of the pallet track is dimensioned such that the front wheels 5*a*, 5*b* of the pallet supported on the supporting bar 9 can move around the rounded forward end of the supporting bar 9 from the upper position of the pallet to the lower position of the pallet to the level of the inner bottom of the frame structure 14. The drive sprocket 3, which is depicted in FIGS. 2, 3 and 4 only by the axle of the drive sprocket, is placed between the idlers 8 and the supporting bars 9 in the direction of motion of the pallets 1.

An endless cogged belt 2 runs around a splined drive sprocket 3 of the drive machine at either end of the track. The drive sprocket 3 is rotated by a drive machine, which is not shown in the figures. The pallets 1 secured to the cogged belt 2 move with the cogged belt, forming an endless track for carrying passengers from the beginning of the travelator to the terminal end of the travelator.

As stated above, the structure of the apparatus at the beginning end of the travelator is identical to the above-described structure of the terminal end. At the beginning end, the pallet is mechanically guided from its lower position to the upper position in the same way as described above. The front wheels 5*a*, 5*b*, which in this direction of motion are the rearward wheels in their turn, are supported by the idlers 8, and the leading end of each pallet is raised by mechanical guidance from the lower level to the transport level, in other words, the pallet is lifted in a substantially horizontal orientation to the conveying level 7. The forced operation enables the apparatus to work in both directions of motion without problems of jamming.

By the method of the invention, the direction of motion of the pallet 1 is changed keeping the pallet continuously in substantially the same orientation during the direction change, in such a manner that during the direction change the trailing end of the pallet 1 in the current direction of motion is brought by mechanical guidance from one level to the other. Stated differently, during the direction change, the trailing end of the pallet 1 as seen in the direction of motion is mechanically guided by means of the idler 8 from the level of the current direction of motion to the other level. The control of the motion is facilitated by the fact that during the direction change the idler 8 is mechanically rotated by those wheels 5*a*, 5*b* or 6*a*, 6*b* of the pallet immediately following the one whose direction of motion is being changed that come foremost in the current direction of motion.

In the above, the same orientation of the pallet 1 means that the pallet is never turned upside down. Rather, the pallet is moved from one level to the other in a substantially horizontal orientation, although some tilting in the forward or backward direction relative to the direction of motion is possible.

Figure 5:
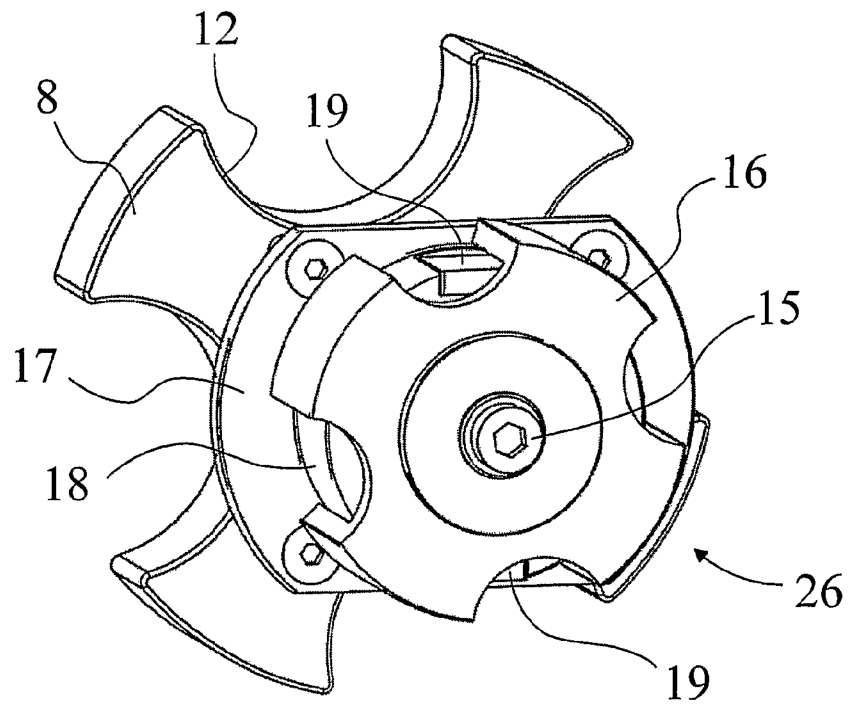
FIG. 5 illustrates an idler applying the concept of the invention in an oblique top view.
Figure 6:
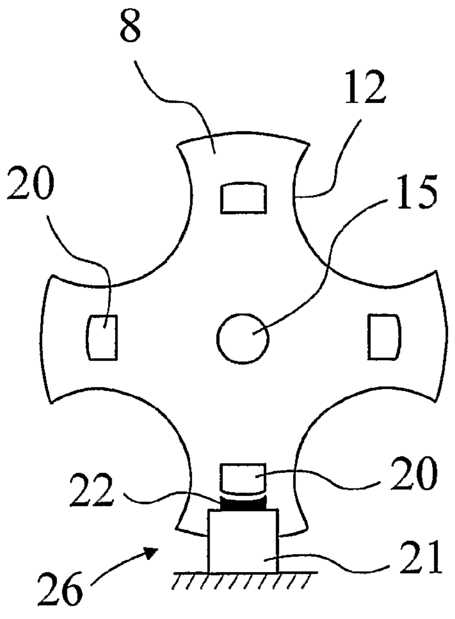
FIG. 6 illustrates another idler applying the concept of the invention in simplified form and in side view.
Figure 7:
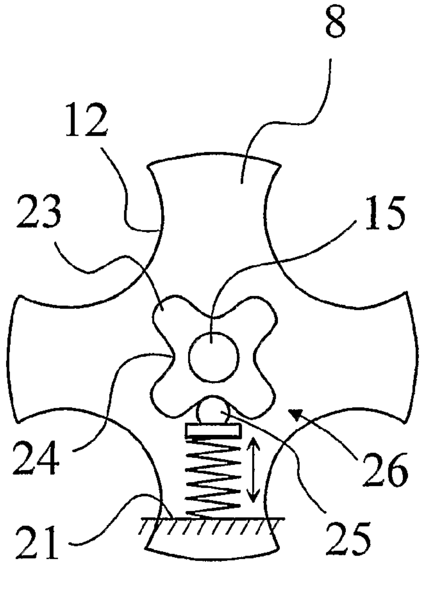
FIG. 7 illustrates yet another idler applying the concept of the invention in simplified form and in side view.

FIGS. 5-7 depict embodiments of idlers 8 embodying the concepts of the invention, with a positioning device 26 attached to them. The positioning device orients the idler 8 in a position where it can receive the wheels of the pallet in the engaging area 12 between the castellations of the idler, and then maintains this position until the moving wheel of the pallet engages the idler 8. This ensures that the idler 8 is in a correct position when it meets the wheel of the pallet, thus avoiding operating disturbances that may result if the idler should meet the wheel of the pallet by a part other than the engaging area 12. The positioning device 26 preferably comprises as a positioning element, e.g., magnets 19, 22 and ferromagnetic counter elements 16, 20, so that the magnetic flux passing through them positions the idler in the correct position for receiving the pallet 1.

The embodiment of the positioning device 26 depicted in FIG. 5 comprises an immobile circular magnet plate 18 fixed to an immobile mounting plate 17 and having one magnet 19 or two magnets 19 on its circumference. If two magnets 19 are provided, they can be spaced by 180 degrees from one another. The axle 15 of the idler 8 is so mounted that it goes through the mounting plate 17 and the center of the magnet plate 18. Fastened to the axle is a ferromagnetic counter element 16 rotating with the axle 15 and having the shape of a castellated wheel with four castellations, similar to the idler. The castellations of both the idler 8 and the counter element 16 are mutually aligned. The counter element 16 has a cylindrical envelope surface with deep cutouts made in it at regular distances and extending to the end surface of the counter element to separate the castellations of the counter element 16 from each other. The inner diameter of the envelope surface of the castellations is dimensioned such that the clearance between the inner surface of the envelope surface and the magnet plate 18 and the magnets 19 is as small as possible, so that the inner surface of the envelope surface rotates immediately over the magnet plate 18 and the magnets 19, the magnets 19 thus having a great attractive force on the castellations of the counter element 16. The magnets 19 and the mutual positions of the castellations of the counter element 16 are dimensioned such that when the wheels of the pallet 1 are not in contact with the engaging areas 12 of the idler 8, the magnets 19 will pull the counter element 16 to a position such that the idler 8 is in the correct position to meet the next pallet wheel so that the next wheel will come precisely to the engaging area 12 of the idler.

FIG. 6 depicts an alternative solution for a positioning device. In this case, a magnet 22 is secured to a mounting 21 fixed to the supporting structures of the travelator. Each castellation of the castellated wheel-type idler 8 includes a ferromagnetic counter element 20, which is centrically placed on each castellation near the outer end of the castellation. The counter elements 20 circulate with the idler 8 and their diameter of their circle of rotation is dimensioned such that the clearance between them and the magnet 22 is as small as possible. In principle, the embodiment shown in FIG. 6 works in the same way as the embodiment of FIG. 5. According to the embodiment of FIG. 6, whenever the wheels of the pallet 1 are not in contact with the engaging areas 12 of the idler 8, the magnet pulls the idler 8 to a position such that the idler 8 is in the correct position to meet the next pallet wheel, so that the next wheel will come precisely into contact with the engaging area 12 of the idler.

FIG. 7 depicts yet another alternative for a positioning device 26. In this embodiment, the positioning device is implemented as a spring-operated device wherein a spring element having a ball 25 is secured to a mounting 21 fixed to the supporting structures of the travelator. Mounted on the axle 15 of a castellated wheel-type idler 8 is a counter element 23 rotating with the idler 8 and having four curved indentations 24 spaced by 90 degrees, one indentation opposite each castellation of the idler 8. The operation of the embodiment according to FIG. 7 is such that whenever the wheels of a pallet 1 are not in contact with the engaging areas 12 of the idler 8, the ball is pressed by the spring pressure to the narrowing bottom of the curved indentation of the counter element 23, thereby driving the idler 8 into a position such that the idler 8 will be in the correct position to meet the next pallet wheel, so that the next wheel will come precisely into contact with the engaging area 12 of the idler.

The person skilled in the art will understand that the invention is not limited to the embodiments described above. Rather, it may be varied within the scope of the claims presented below. Thus, for example, instead of a cogged belt, the power transmission means used may comprise a suitable different type of belt, chain or, with certain limitations, even rope or equivalent. In this case, instead of a sprocket, the drive wheel 3 may be, e.g., a chain wheel. For example, a chain is often easier to attach to a pallet and a chain construction is narrower than a cogged belt construction.

Likewise, the skilled person will understand that, instead of fixed magnets 19, 22 in the positioning device 26, the magnets can be placed on the rotating part and the ferromagnetic part can be stationary. Similarly, the construction of the spring-loaded positioning device may vary from that described above.

It will also be understood that, instead of a horizontal operating position, the above-described travelator structure can also be used in upwards or downwards inclined positions, e.g., in auto ramps or equivalent.

It will also be understood that the leading ends of the pallets in the direction of motion can also be guided by a curved track. This construction works well especially when the pallet is rising from the lower level to the upper level.

It will also be understood that, instead of being driven by the pallet coming after the one whose direction of motion is being changed, the idler 8 can be driven in other ways; for example by a separate drive machine or by the drive machine or equivalent of the pallet track. The idlers 8 can be controlled synchronously, e.g., from the drive sprocket 3 so that the pallet 1 remains in a horizontal orientation while the idler 8 is turning. The transmission between the drive sprocket 3 and the idler 8 can be implemented, e.g., using cogged belt transmission, which can guarantee synchronous mutual motion of the drive sprocket 3 and the idler 8. When synchronous control of the idler device 8 is used, the wheels 5 and 6 of the pallet need not necessarily be located at the corners of the pallet at a distance from each other that is equal to the radius of turn on the drive sprocket 3.

It will also be understood by the skilled person that the idlers 8 may have a shape differing from that described above. Instead of rounded-bottom indentations, the idler may have V-shaped or similar indentations, in which case the idler may resemble, e.g., a four-bladed impeller with a small hub. Similarly, instead of four castellations, the idler may also have three castellations. In this case, the distance of the wheel of the pallet from the rotational center of the idler with three castellations will change during the contact. It is still preferable that wheels of three pallets are always simultaneously in contact with an idler.

In addition, instead of guiding the pallet by engaging the currently trailing wheel, the idler 8 may also guide the pallet by engaging some other suitable part, e.g., a special shape of the bottom of the pallet or a corresponding part.

The invention claimed is:

1. A method for changing the direction of motion of a pallet moving on wheels at an end of a travelator, comprising:

moving the pallet in a traveling direction at a first level;

positioning a supporting element comprising a rotatable wheel in a fixed alignment to receive a wheel of the pallet using a positioning device prior to contact between the supporting element and the wheel of the pallet;

maintaining the fixed alignment of the rotatable wheel until the wheel of the pallet engages the rotatable wheel;

contacting the wheel of the pallet with the supporting element and positively guiding a trailing end of the pallet from the first level to a second level different than the first level by supporting the wheel of the pallet with the supporting element; and moving the pallet in a return direction at the second level;

wherein the pallet maintains a substantially constant orientation during the change of direction of motion.

2. The method according to claim 1, further comprising:

positively guiding the trailing end of the pallet from the first level to the second level using the supporting element at a first end of the travelator; and positively guiding the trailing end of the pallet from the second level to the first level using another supporting element at a second end of the travelator.

3. The method according to claim 1, further comprising rotating the supporting element using a second pallet immediately following the pallet that is changing direction.

4. The method according to claim 3, further comprising rotating the supporting element using leading wheels of the second pallet.

5. The method according to claim 1, further comprising:

guiding the trailing end of the pallet during the direction change with at least one engaging area located on the supporting element, the engaging area engaging at least one wheel on the pallet; and positioning the engaging area between direction changes of successive pallets to receive a trailing wheel of a successive pallet.

6. The method according to claim 5, wherein positioning the engaging area comprises using a positioning device including at least one of a spring or a magnet.

7. An apparatus for changing the direction of motion of a pallet moving on wheels at an end of a travelator, comprising:

a power transmission element adapted to move the pallets in a traveling direction at a first level and in a return direction at a second level different from the first level;

a supporting element adapted to positively guide a trailing end of the pallet from the first level to the second level, and to change the direction of motion of the pallet while maintaining the pallet at a substantially constant orientation; and a positioning device adapted to position the supporting element in a fixed alignment to receive a wheel of the pallet, wherein the positioning device maintains the fixed alignment until the wheel of the pallet engages the supporting element.

8. The apparatus of claim 7, wherein the supporting element comprises at least one engaging area adapted to receive a wheel of the pallet such that a trailing wheel of a successive pallet engages the engaging area.

9. The apparatus of claim 8, wherein the positioning device comprises at least one of a spring or a magnet adapted to position the engaging area between direction changes of successive pallets.

10. The apparatus of claim 7, wherein the supporting element comprises:

a wheel freely rotating on an axle; and a plurality of engaging areas formed on a surface of the wheel adapted to receive one or more wheels of the pallet;

wherein the engaging areas comprise indentations.

11. The apparatus of claim 7, further comprising a track for the wheels, wherein the supporting element is located at an end of the track and is adapted to be positively rotated by one or more wheels of the pallet.

12. The apparatus of claim 11, wherein the supporting element is adapted to be positively rotated by the wheels of a second pallet located immediately behind the pallet undergoing a change in direction.

* * * * *